US009903268B2

(12) United States Patent
Smiljanovski et al.

(10) Patent No.: US 9,903,268 B2
(45) Date of Patent: Feb. 27, 2018

(54) INTERNAL COMBUSTION ENGINE WITH TWO-STAGE SUPERCHARGING CAPABILITY AND WITH EXHAUST-GAS AFTERTREATMENT ARRANGEMENT, AND METHOD FOR OPERATING AN INTERNAL COMBUSTION ENGINE

(71) Applicant: Ford Global Technologies, LLC, Dearborn, MI (US)

(72) Inventors: Vanco Smiljanovski, Bedburg (DE); Helmut Matthias Kindl, Aachen (DE); Joerg Kemmerling, Monschau (DE); Franz Arnd Sommerhoff, Aachen (DE); Franz J. Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 15/081,263

(22) Filed: Mar. 25, 2016

(65) Prior Publication Data
US 2016/0290218 A1    Oct. 6, 2016

(30) Foreign Application Priority Data
Apr. 2, 2015   (DE) .................. 10 2015 206 041

(51) Int. Cl.
*F02B 33/44* (2006.01)
*F02M 25/07* (2006.01)
(Continued)

(52) U.S. Cl.
CPC .......... *F02B 37/004* (2013.01); *F02B 37/013* (2013.01); *F02B 37/127* (2013.01);
(Continued)

(58) Field of Classification Search
CPC ...... F02B 37/004; F02B 37/013; F02B 37/24; F02B 37/127; F02M 26/08; Y02T 10/144
(Continued)

(56) References Cited

U.S. PATENT DOCUMENTS 6,851,256 B2 *   2/2005   Chamoto ........... B01D 53/9495
                                                123/559.1
6,973,787 B2 * 12/2005   Klingel ................... F02B 37/18
                                                   60/605.2
(Continued)

FOREIGN PATENT DOCUMENTS

DE           19837978 A1   11/1999
DE       102008017280 A1   11/2009
(Continued)

*Primary Examiner* — Thai Ba Trieu
(74) *Attorney, Agent, or Firm* — Julia Voutyras; McCoy Russell LLP (57) ABSTRACT

A supercharged internal combustion engine includes at least two exhaust-gas turbochargers arranged in series, wherein a first exhaust-gas turbocharger serves as a low-pressure stage and a second exhaust-gas turbocharger serves as a high-pressure stage. A second turbine of the second exhaust-gas turbocharger may be present upstream of a first turbine of the first exhaust-gas turbocharger, and a second compressor of the second exhaust-gas turbocharger may be arranged in an intake system downstream of a first compressor of the first exhaust-gas turbocharger and a first bypass line may branch off upstream of the second turbine and join back at a junction point between the first turbine and the second turbine. The supercharged engine also includes an exhaust-gas recirculation arrangement and at least one exhaust-gas aftertreatment system between the first turbine and the second turbine.

18 Claims, 3 Drawing Sheets

(51) Int. Cl.
*F01N 5/04* (2006.01)
*F02B 33/00* (2006.01)
*F02B 37/00* (2006.01)
*F02B 37/24* (2006.01)
*F02M 26/08* (2016.01)
*F02B 37/013* (2006.01)
*F02B 37/12* (2006.01)

(52) U.S. Cl.
CPC ............. *F02B 37/24* (2013.01); *F02M 26/08* (2016.02); *Y02T 10/144* (2013.01)

(58) Field of Classification Search
USPC ........ 60/612, 605.2, 280; 123/562; 701/102, 701/108
See application file for complete search history.

(56) References Cited

U.S. PATENT DOCUMENTS

| | | | | |
|---|---|---|---|---|
| 7,000,384 B2 * | 2/2006 | Kagenishi | ............... | F01N 3/023 60/274 |
| 7,426,830 B2 * | 9/2008 | Schorn | ................ | F02B 37/013 60/612 |
| 7,490,462 B2 * | 2/2009 | Roozenboom | ........ | F02B 37/013 60/612 |
| 7,540,150 B2 * | 6/2009 | Schmid | ................ | F02B 37/013 60/612 |
| 7,712,311 B2 * | 5/2010 | Ren | ........................ | F02M 26/06 60/602 |
| 7,748,218 B2 * | 7/2010 | McNulty | ............... | F02B 37/013 60/612 |
| 8,234,864 B2 * | 8/2012 | Easley, Jr. | ............. | F02B 37/013 60/612 |
| 8,429,912 B2 * | 4/2013 | Guggenberger | ...... | F02B 37/013 60/612 |
| 8,495,876 B2 * | 7/2013 | Pagot | .................... | F02B 37/013 60/612 |
| 8,495,992 B2 * | 7/2013 | Roth | ...................... | F02M 26/07 60/605.2 |
| 8,671,682 B2 | 3/2014 | Parlow et al. | | |
| 2006/0059910 A1 * | 3/2006 | Spaeder | ................ | F02B 37/18 60/612 |
| 2006/0123782 A1 * | 6/2006 | Rosin | .................. | F02D 41/0007 60/612 |
| 2009/0178406 A1 | 7/2009 | Matthews et al. | | |
| 2010/0180590 A1 * | 7/2010 | Andreae | ............... | F02B 37/013 60/600 |
| 2011/0146269 A1 * | 6/2011 | Hepburn | ............... | F02M 26/06 60/605.2 |
| 2012/0017587 A1 * | 1/2012 | Yoshida | .................. | F02B 37/18 60/602 |
| 2012/0216529 A1 | 8/2012 | Joshi et al. | | |
| 2013/0006494 A1 * | 1/2013 | Petrovic | ............... | F02B 37/013 701/102 |
| 2013/0104543 A1 * | 5/2013 | Zoldak | ................... | F02M 26/08 60/605.2 |
| 2013/0199162 A1 * | 8/2013 | Schlemmer-Kelling | ................ | F02B 37/013 60/278 |
| 2015/0176454 A1 * | 6/2015 | Dreves | ................... | F02B 37/013 60/612 |
| 2016/0010528 A1 * | 1/2016 | Light-Holets | .......... | F02M 26/05 60/605.2 |
| 2016/0177850 A1 * | 6/2016 | Mogavero | ............. | F02B 37/013 60/612 |
| 2016/0230707 A1 * | 8/2016 | Tanaka | ............... | F02M 25/0836 |
| 2016/0326996 A1 * | 11/2016 | Zhang | ............. | F02M 35/10229 |
| 2016/0333827 A1 * | 11/2016 | Smiljanovski | ......... | F02M 26/08 60/605.2 |

FOREIGN PATENT DOCUMENTS

| | | | | |
|---|---|---|---|---|
| DE | 102009036743 A1 | | 2/2011 | |
| DE | 102012019947 | * | 4/2014 | ............ F02B 37/013 |
| DE | 102013004649 A1 | | 9/2014 | |
| DE | 102015001662 | * | 8/2016 | ............ F02B 37/013 |
| EP | 1396619 A1 | | 3/2004 | |
| EP | 1640596 A1 | | 3/2006 | |
| JP | 2008157139 A | * | 7/2008 | ............ F02D 41/123 |
| JP | 2011226391 A | * | 11/2011 | |
| WO | 2012028768 A1 | | 3/2012 | |

* cited by examiner

INTERNAL COMBUSTION ENGINE WITH TWO-STAGE SUPERCHARGING CAPABILITY AND WITH EXHAUST-GAS AFTERTREATMENT ARRANGEMENT, AND METHOD FOR OPERATING AN INTERNAL COMBUSTION ENGINE

CROSS REFERENCE TO RELATED APPLICATION

This application claims priority to German Patent Application No. 102015206041.1, filed Apr. 2, 2015, the entire contents of which are hereby incorporated by reference for all purposes.

FIELD

The disclosure relates to an internal combustion engine.

BACKGROUND/SUMMARY

Within the context of the present disclosure, the expression "internal combustion engine" encompasses Otto-cycle engines, diesel engines and also hybrid internal combustion engines, which utilize a hybrid combustion process, and hybrid drives which comprise not only the internal combustion engine but also an electric machine which may be connected in terms of drive to the internal combustion engine and which receives power from the internal combustion engine or which, as a switchable auxiliary drive, additionally outputs power.

Supercharging serves primarily to increase the power of the internal combustion engine. The air required for the combustion process is compressed, as a result of which a greater air mass can be supplied to each cylinder per working cycle. In this way, the fuel mass and therefore the mean pressure may be increased.

Supercharging is a suitable means for increasing the power of an internal combustion engine while maintaining an unchanged swept volume, or for reducing the swept volume while maintaining the same power. Supercharging leads to an increase in volumetric power output and an improved power-to-weight ratio. If the swept volume is reduced, it is thus possible to shift the load collective toward higher loads, at which the specific fuel consumption is lower. By means of supercharging in combination with a suitable transmission configuration, it is also possible to realize so-called downspeeding, with which it is likewise possible to achieve a lower specific fuel consumption. Supercharging consequently assists in the constant efforts in the development of internal combustion engines to minimize fuel consumption to improve the efficiency of the internal combustion engine.

For supercharging, an exhaust-gas turbocharger including a compressor and a turbine are arranged on the same shaft. The hot exhaust-gas flow is supplied to the turbine and expands in the turbine with a release of energy, which sets the shaft in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained.

A charge-air cooler may be provided in the intake system downstream of the compressor, cooling the compressed charge air before it enters at least one cylinder. The charge-air cooler lowers the temperature and thereby increases the density of the charge air, improving charging of the at least one cylinder.

The exhaust-gas turbocharger, for example, in comparison with a mechanical charger, may utilize the exhaust-gas energy of the hot exhaust gases for transmitting power between the charger and internal combustion engine and may not need a mechanical connection. In contrast, a mechanical charger extracts the energy required for driving it entirely from the internal combustion engine, and thereby reduces the output power and consequently adversely affects the efficiency.

Problems are encountered in the configuration of the exhaust-gas turbocharging, wherein it is basically sought to obtain a noticeable performance increase at all engine speed ranges. In the case of supercharged internal combustion engines with an exhaust-gas turbocharger, a noticeable torque drop is observed when a certain engine speed is undershot. The effect is undesirable and is thus, also one of the most severe disadvantages of exhaust-gas turbocharging.

The torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. As a result, the charge pressure ratio likewise decreases in the direction of lower engine speeds, which equates to a torque drop.

According to the prior art, a variety of measures have been used to improve the torque characteristic of an exhaust gas-turbocharged internal combustion engine, including a small turbine cross section and simultaneous provision of an exhaust-gas blow-off facility. To this end, the turbine is equipped with a bypass line which branches off from the exhaust-gas discharge system upstream of the turbine and in which a shut-off element is arranged. Such a turbine is also referred to as a wastegate turbine. If the exhaust-gas mass flow exceeds a critical value, a part of the exhaust-gas flow is conducted past the turbine, that is to say is blown off, via a bypass line during the course of the so-called exhaust-gas blow-off. This procedure has the disadvantage that the high-energy blown-off exhaust gas remains unutilized and the supercharging behavior is often insufficient at higher engine speeds.

A turbine having a variable turbine geometry permits a more comprehensive adaptation to the respective operating point of the internal combustion engine by way of adjustment of the turbine geometry or the effective turbine cross section, enabling engine speed-dependent or load-dependent regulation of the turbine geometry to take place to a certain extent.

The torque characteristic of the supercharged internal combustion engine may also be improved by means of multiple turbochargers arranged in parallel, for example, by means of multiple turbines of relatively small turbine cross section arranged in parallel. The turbines may be activated successively with increasing exhaust-gas flow rate, similar to sequential supercharging.

The torque characteristic may also be influenced by connecting multiple exhaust-gas turbochargers in series. In one example, connecting two exhaust-gas turbochargers in series, wherein a first exhaust-gas turbocharger serves as a high-pressure stage and a second exhaust-gas turbocharger serves as a low-pressure stage, the compressor characteristic map may be expanded to include both smaller compressor flows and larger compressor flows.

In particular, with the first exhaust-gas turbocharger, which serves as a high-pressure stage, it is possible for the surge limit to be shifted in the direction of smaller compressor flows, because of which high charge pressure ratios may be obtained even with small compressor flows, which may considerably improve the torque characteristic in the lower part-load range. This is achieved by using the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again downstream of the high-pressure turbine and upstream of the low-pressure turbine, that is to say between the two turbines, wherein a shut-off element is arranged in the bypass line in order to control the exhaust-gas flow conducted past the high-pressure turbine.

The two exhaust-gas turbochargers connected in series further increase the power boost through supercharging. Furthermore, the response behavior of an internal combustion engine with two exhaust-gas turbochargers may be considerably improved, particularly in the part-load range compared to a similar internal combustion engine with single-stage supercharging. The reason for this is that the relatively small high-pressure stage is less inert than a relatively large exhaust-gas turbocharger used for single-stage supercharging, because a rotor or impeller of an exhaust-gas turbocharger of smaller dimensions may accelerate and decelerate more quickly.

This also has advantages with regard to particle emissions. In a large single exhaust-gas turbocharger, during acceleration, the required increase in the air mass supplied to the cylinders for the increased fuel flow rate takes place only with a delay owing to the inertia of the large impellers. In contrast, with a relatively small high-pressure turbocharger, the charge air is supplied to the engine virtually without a delay, and thus operating states with increased particle emissions are more commonly eliminated.

Exhaust-gas turbocharging in combination with exhaust-gas aftertreatment has proven to be problematic. When using an exhaust-gas turbocharger, it is fundamentally sought to arrange the turbine of the charger as close to the engine, that is to say to the outlet openings of the cylinder, as possible in order thereby to be able to optimally utilize the exhaust-gas enthalpy of the hot exhaust gases, which is determined significantly by the exhaust-gas pressure and the exhaust-gas temperature, and to ensure a fast response behavior of the turbocharger. Furthermore, the path of the hot exhaust gases to the different exhaust-gas aftertreatment systems should also be as short as possible such that the exhaust gases are given little time to cool down and the exhaust-gas aftertreatment systems reach their operating temperature or light-off temperature as quickly as possible, in particular after a cold start of the internal combustion engine.

The thermal inertia of the part of the exhaust lines situated between the outlet opening at the cylinder and the turbine, or between the outlet opening at the cylinder and the exhaust-gas aftertreatment system, should therefore also be as low as possible, which may be achieved by reducing the mass and the length of the corresponding parts.

To achieve the above-stated aims, in one example, exhaust lines may be substantially merged within the cylinder head. The length of the exhaust lines is reduced by way of the integration into the cylinder head, whereby not only the thermal inertia but also the line volume of the relevant part are reduced, improving the response behavior of a turbine, and increasing the enthalpy of the exhaust gases at the inlet into the turbine.

While a single turbine may easily be positioned close to the engine, arranging a plurality of turbines close to the engine simultaneously may be a problem, for example, as in the internal combustion including two turbines arranged in series.

EP 1 396 619 A1 relates to the simultaneous use of exhaust-gas turbocharging and exhaust-gas aftertreatment, wherein the exhaust-gas aftertreatment system may be arranged as close as possible to the outlet of the internal combustion engine. In one embodiment according to EP 1 396 619 A1, the exhaust-gas flow may be conducted past both turbines by means of a suitable switching device and bypass line. This offers advantages with regard to a catalytic converter arranged in the exhaust-gas discharge system downstream of the turbines, in particular after a cold start or in the warm-up phase of the internal combustion engine, because the hot exhaust gases are supplied directly to the catalytic converter and are not firstly conducted through the turbines which are to be regarded as a temperature sink. In this way, the catalytic converter reaches its light-off temperature more quickly after a cold start or in the warm-up phase. A further embodiment provides the arrangement of a second catalytic converter, for example, a primary catalytic converter in the bypass line that bypasses the two turbines.

However, the inventors herein have recognized potential issues with such systems. As one example, a disadvantage of the concept described in EP 1 396 619 A1 is that in the warm-up phase of the internal combustion engine, all of the exhaust gas is supplied to the at least one catalytic converter for heating purposes, and no exhaust gas is conducted through the turbines, such that, during the warm-up phase, no supercharging occurs owing to a lack of charge pressure.

US 2009/0178406 A1 and US 2012/0216529 A1 describe an internal combustion in which an exhaust-gas aftertreatment system is arranged between the turbines. A bypass line, which branches off from the exhaust-gas discharge system upstream of the high-pressure turbine, opens into the exhaust-gas discharge system again upstream of the low-pressure turbine, having bypassed the high-pressure turbine and the said exhaust-gas aftertreatment system. In the presence of low exhaust-gas flow rates, in particular after a cold start or in the warm-up phase, the exhaust gas is supplied to the small high-pressure turbine, whereby supercharging of the internal combustion engine is achieved under these operating conditions. In the references cited above, the exhaust-gas aftertreatment system arranged downstream of the high-pressure turbine serves to ensure the required conversion of the pollutants.

With increasing exhaust-gas flow, an increasing amount of exhaust gas is conducted past the high-pressure turbine, increasing amounts of untreated exhaust gas flowing to the low-pressure turbine. Therefore, it may be desirable to have an additional exhaust-gas aftertreatment system downstream of the low-pressure turbine. However, the use of noble metals is primarily responsible for the high production costs of an exhaust-gas aftertreatment system. The need to provide more than one exhaust-gas aftertreatment system may increase costs significantly along with packaging disadvantages due to the increased space requirement of the exhaust-gas aftertreatment arrangement. The stated conflict between exhaust-gas turbocharging and exhaust-gas aftertreatment cannot be resolved according to the prior art.

In one embodiment, a supercharged internal combustion engine may include an intake system for the supply of charge air to at least one cylinder and having an exhaust-gas discharge system for the discharge of the exhaust gas from the at least one cylinder and having at least two exhaust-gas turbochargers which are arranged in series. A first exhaust-gas turbocharger may serve as a low-pressure stage and a second exhaust-gas turbocharger serve as a high-pressure stage. A second turbine of the second exhaust-gas turbocharger may be arranged in the exhaust-gas discharge system upstream of a first turbine of the first exhaust-gas turbocharger. A second compressor of the second exhaust-gas turbocharger may be arranged in the intake system downstream of a first compressor of the first exhaust-gas turbocharger. A first bypass line may branch off from the exhaust-gas discharge system upstream of the second turbine and may join back the exhaust-gas discharge system again to form a junction point between the first turbine and the second turbine with a shut-off element. An exhaust-gas recirculation arrangement may be coupled to the supercharged internal combustion engine. At least one exhaust-gas aftertreatment system may be arranged in the exhaust-gas discharge system between the first turbine and the second turbine.

This arrangement of the exhaust-gas aftertreatment system has the technical effect that all of the exhaust gas, under all operating conditions, passes entirely through the at least one exhaust-gas aftertreatment system, such that no further additional exhaust-gas aftertreatment system of the same type has to be provided, that is to say is necessary, downstream of the low-pressure turbine. This therefore yields advantages with regards to both, cost and packaging.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The disclosure also relates to a method for operating a supercharged internal combustion engine of the above-stated type, wherein an internal combustion engine of the above-mentioned type may be used as a motor vehicle drive unit. In this way, the present disclosure provides a supercharged internal combustion engine including an inexpensive exhaust-gas aftertreatment arrangement along with compact packaging and a method for operating a supercharged internal combustion engine of the above-stated type.

In the case of the internal combustion engine according to the disclosure, the at least one exhaust-gas aftertreatment system arranged between the first turbine and the second turbine is not provided in the bypass line that bypasses the high-pressure turbine, but rather is provided downstream of the high-pressure turbine and of the bypass line that bypasses the high-pressure turbine.

The fact that an exhaust-gas aftertreatment system has to be designed for an expected volume flow, in order to ensure a required minimum residence time of the exhaust gas in the exhaust-gas aftertreatment system as it flows through, has proven not to be a problem here. The reasons are as follows.

In the presence of low exhaust-gas flow rates, in particular after a cold start or in the warm-up phase, the exhaust gas is supplied entirely or predominantly to the small high-pressure turbine. The exhaust gas supplied to the high-pressure turbine expands as it flows through the high-pressure turbine, whereby the density of the exhaust gas is reduced, and the volume flow increases.

By contrast, with increasing exhaust-gas flow, exhaust gas is increasingly conducted past the high-pressure turbine. The exhaust gas conducted past the high-pressure turbine does not undergo any expansion, that is to say does not undergo any pressure reduction in the high-pressure turbine, such that, upstream of the exhaust-gas aftertreatment system and of the low-pressure turbine, an exhaust gas is present which is of relatively high pressure and of relatively high density. A relatively high density is the basis for a—comparatively—small volume flow.

The above-described effects regarding the exhaust-gas volume flow have the effect that one exhaust-gas aftertreatment system of a particular type is sufficient, both in the presence of small exhaust-gas masses and in the presence of relatively large exhaust-gas masses, for the aftertreatment of all of the exhaust gas.

It has proven not to be disadvantageous here that, owing to the arrangement of the at least one exhaust-gas aftertreatment system between the turbines, the low-pressure turbine in some cases can be arranged not particularly close to the engine but rather possibly further downstream in the exhaust-gas discharge system, because an exhaust-gas aftertreatment arrangement is generally, or commonly, associated with an exothermic reaction, and the exhaust-gas temperature is thus increased once again, as a result of exhaust-gas aftertreatment, before the exhaust gas enters the low-pressure turbine. An example of a corresponding exhaust-gas aftertreatment system is an oxidation catalytic converter; a further example is a particle filter.

By virtue of the fact that all of the exhaust gas undergoes aftertreatment upstream of the low-pressure turbine, it is possible to use a relatively small-volume exhaust-gas aftertreatment system, that is to say one which is of small volume in relation to an exhaust-gas aftertreatment system of the same type provided downstream of the low-pressure turbine. This is advantageous both with regard to costs and with regard to the packaging of the drive unit as a whole.

The disclosure relates to a supercharged internal combustion engine having an intake system for the supply of charge air to at least one cylinder and having an exhaust-gas discharge system for the discharge of the exhaust gas from the at least one cylinder. The supercharged internal combustion engine also includes at least two exhaust-gas turbochargers that may be arranged in series, wherein each of the at least two exhaust-gas turbocharger includes a turbine arranged in the exhaust-gas discharge system and a compressor arranged in the intake system.

The supercharged internal combustion engine according to the present disclosure aims to realize an inexpensive exhaust-gas aftertreatment arrangement along with compact packaging.

According to the disclosure, an exhaust-gas recirculation arrangement is provided, which comprises a line for exhaust-gas recirculation. To adhere to future limits for nitrogen oxide emissions, exhaust-gas recirculation is being used increasingly, that is to say the recirculation of exhaust gases from an outlet side to an inlet side, whereby it is possible for the nitrogen oxide emissions to be considerably reduced with increasing exhaust-gas recirculation rate. Here, the exhaust-gas recirculation rate $x_{EGR}$ is determined as $x_{EGR}=m_{EGR} (m_{EGR}+m_{fresh\ air})$, where $m_{EGR}$ denotes the mass of recirculated exhaust gas and $m_{fresh\ air}$ denotes the supplied fresh air which is conducted through a compressor and compressed.

Exhaust-gas recirculation is also suitable for reducing the emissions of unburned hydrocarbons in the part-load range.

The at least one exhaust-gas aftertreatment system may be an oxidation catalytic converter, a three-way catalytic converter, a storage catalytic converter, a selective catalytic converter and/or a particle filter.

Embodiments of the supercharged internal combustion engine are provided in which a second bypass line is provided which branches off from the intake system upstream of the second compressor of the second exhaust-gas turbocharger and opens into the intake system again downstream of the second compressor and in which a shut-off element is arranged.

The second bypass line allows the high-pressure compressor to be bypassed. This makes it possible for the charge-air mass flow conducted through the high-pressure compressor to be coordinated with the exhaust-gas mass flow conducted through the high-pressure turbine, and thus with the available turbine power of the high-pressure stage.

In situations in which the exhaust gas is supplied predominantly or entirely to the first turbine, bypassing the high-pressure turbine, and thus the second turbine outputs no power or virtually no power, the first compressor generates the necessary charge pressure, whereas the second compressor merely constitutes a flow resistance for the charge air, which is drawn in and compressed by the first compressor, on the path to the cylinders. The second bypass line then allows the second compressor to be bypassed.

Embodiments of the internal combustion engine are also provided in which the second compressor has a variable compressor geometry. This embodiment is advantageous in particular, if the turbine of the second exhaust-gas turbocharger has a variable turbine geometry, and a variable compressor geometry may thus be coordinated with the turbine geometry in continuous fashion.

A variable compressor geometry has proven to be advantageous in particular if only a small exhaust-gas mass flow is conducted through the second turbine because, by adjustment of the vanes, the surge limit of the compressor in the compressor characteristic map may be shifted in the direction of small compressor flows, and thus the compressor is prevented from operating beyond the surge limit.

The variable compressor geometry of the second compressor however also offers advantages in operating states in which the exhaust gas flows predominantly or entirely through the first turbine, and the first compressor generates the required charge pressure. In these situations, the second compressor merely constitutes a flow resistance.

A variable compressor geometry may render the second bypass line unnecessary, because the compressor cross section can be adapted to the charge-air flow. For this purpose, however, the geometry of the compressor or of the flow cross section of the compressor must be adjustable in a broad range, such that the compressor may be adapted to both very small and very large charge-air flows.

Nevertheless, embodiments of the internal combustion engine may however be provided, in which the second compressor may have a fixed, invariable compressor geometry. By contrast to the above-described compressor with variable geometry, a control requirement is, in principle, eliminated here. Altogether, this embodiment has cost advantages.

Embodiments of the supercharged internal combustion engine are provided in which the second turbine of the second exhaust-gas turbocharger has a variable turbine geometry.

A variable turbine geometry increases the flexibility of the supercharging. It permits an adaptation of the turbine geometry to the present exhaust-gas flow. Here, guide blades for influencing the flow direction are arranged upstream of the impeller of the turbine. In contrast to the impeller blades of the rotating impeller, the guide blades do not rotate with the shaft of the turbine that is to say with the impeller. The guide blades are duly arranged to be stationary but not to be completely immovable, rather so as to be rotatable about their axes such that the flow approaching the impeller blades may be influenced.

In contrast, if a turbine has a fixed, invariable geometry, the guide blades are not only stationary but are also completely immovable, that is to say rigidly fixed, if guide blades are provided at all.

In particular, the combination of a turbine with variable turbine geometry and a bypass line that bypasses the turbine makes it possible for the high-pressure turbine to be designed for very small exhaust-gas flows and thus for the lower part-load range. It is consequently possible to achieve high turbine pressure ratios even at low engine speeds and even in the case of very low exhaust-gas flow rates.

Embodiments of the supercharged internal combustion engine are provided in which a third bypass line is provided which branches off from the intake system downstream of the first compressor and in which a shut-off element is arranged. The third bypass line may serve for charge-air blow-off and may open into the intake system again upstream of the first compressor, whereby the charge air compressed in the first compressor is not blown off but is rather merely recirculated. A shut-off element is provided in the bypass line for the purpose of controlling the blown-off or recirculated charge airflow rate.

The third bypass line may however also serve for the intake of charge air, specifically in situations in which virtually no exhaust gas or no exhaust gas flows through the first, large turbine and thus the second, smaller turbine performs the compressor work. The first compressor then merely constitutes a flow resistance for the charge air drawn in by the second compressor. A bypass line then enables the first compressor to be bypassed, thus permitting dethrottling of the intake system.

From that which has been stated above, it follows that the low-pressure turbine may likewise be equipped with a bypass line.

Embodiments of the supercharged internal combustion engine are provided in which the at least one exhaust-gas aftertreatment system comprises an oxidation catalytic converter.

Even without additional measures, oxidation of the unburned hydrocarbons and of carbon monoxide duly takes place during the expansion and discharge of the cylinder charge at a sufficiently high temperature level and in the presence of sufficiently large oxygen quantities. However, because of the exhaust-gas temperature, which falls quickly in the downstream direction, and the consequently rapidly decreasing rate of reaction, the reactions are quickly halted.

For this reason, use is made of catalytic reactors including catalytic materials that increase the rate of certain reactions and ensure oxidation even at low temperatures. If nitrogen oxides are additionally to be reduced, this may be achieved, in the case of Otto-cycle engines, with a three-way catalytic converter, which however for this purpose requires stoichiometric operation ($\lambda \approx 1$) of the Otto-cycle engine within narrow limits. Here, the nitrogen oxides are reduced by means of the non-oxidized exhaust-gas components, which are present, specifically the carbon monoxides, and the unburned hydrocarbons, wherein the exhaust-gas components are oxidized at the same time.

In internal combustion engines, which are operated with an excess of air, that is to say for example Otto-cycle engines which operate in the lean-burn mode, but in particular, direct-injection diesel engines and direct-injection Otto-cycle engines, the nitrogen oxides contained in the exhaust gas cannot be reduced out of principle, owing to the lack of reducing agent. Then, for the oxidation of the unburned hydrocarbons and of carbon monoxide, an oxidation catalytic converter is provided in the exhaust-gas discharge system.

Embodiments of the supercharged internal combustion engine are provided in which the at least one exhaust-gas aftertreatment system comprises a particle filter. To minimize the emissions of soot particles, use is made of so-called regenerative particle filters, which filter the soot particles out of the exhaust gas and store them, with the soot particles being burned off intermittently during the course of the regeneration of the filter. For this purpose, oxygen or an excess of air in the exhaust gas is required in order to oxidize the soot in the filter.

The filter must be regenerated regularly, that is to say at fixedly predefined intervals, and generally when a predefined mileage or operating duration is reached. The high temperatures for the regeneration of the particle filter, of approximately 550° C. without catalytic assistance, are reached only at high loads and high engine speeds during operation. It has therefore proven to be advantageous if, according to the disclosure, all of the exhaust gas may be supplied directly to the at least one close-coupled exhaust-gas aftertreatment system that is to say in the present case the particle filter.

Each of the above-mentioned exhaust-gas aftertreatment systems may also be used, that is to say designed, as a component of a combined exhaust-gas aftertreatment system. Consequently, it is also possible for multiple exhaust-gas aftertreatment systems of different type to be used.

Embodiments of the supercharged internal combustion engine are provided in which the first compressor is designed to be larger than the second compressor, because the first compressor forms the low-pressure stage within the context of a two-stage compression, whereas the second compressor compresses the already pre-compressed air and thus constitutes the high-pressure stage.

Embodiments of the supercharged internal combustion engine are provided in which the first turbine is designed to be larger than the second turbine. Within the context of a two-stage compression, the second turbine serves as a high-pressure turbine, such that, in the first turbine, an exhaust-gas flow expands which is already at a relatively low pressure and has a relatively low density owing to the fact that it has already passed through the high-pressure stage. By contrast, in the presence of relatively high exhaust-gas flow rates, the exhaust gas is supplied, at least predominantly bypassing the high-pressure turbine, to the low-pressure turbine, which must therefore be of large or relatively large design.

Embodiments of the supercharged internal combustion engine are provided in which a shut-off element may be electrically, hydraulically, pneumatically, mechanically, or magnetically controlled, via an engine controller.

Embodiments of the supercharged internal combustion engine are provided in which a shut-off element is controllable, that is to say switchable, in continuously variable fashion or in stepped fashion.

Embodiments of the supercharged internal combustion engine are provided in which an exhaust-gas recirculation arrangement is provided.

Embodiments of the supercharged internal combustion engine are provided in which an additional cooler is provided in the line for exhaust-gas recirculation. The additional cooler lowers the temperature in the hot exhaust-gas flow and thereby increases the density of the exhaust gases. The temperature of the cylinder fresh charge, which results upon the mixing of the fresh air with the recirculated exhaust gases, is consequently further reduced in this way, because of which the additional cooler also contributes to improved charging of the combustion chamber with fresh mixture.

Embodiments of the internal combustion engine are provided in which a shut-off element is provided in the line for exhaust-gas recirculation. The shut-off element serves for the control of the exhaust-gas recirculation rate.

To obtain a considerable reduction in nitrogen oxide emissions, high exhaust-gas recirculation rates are required which may be of the order of magnitude of $x_{EGR} \approx 60\%$ to 70%.

Embodiments of the supercharged internal combustion engine are provided in which an exhaust-gas recirculation arrangement is provided which comprises a line, which branches off from the exhaust-gas discharge system upstream of the turbines and opens into the intake system, preferably downstream of the compressors.

Embodiments of the supercharged internal combustion engine are also provided in which an exhaust-gas recirculation arrangement is provided which comprises a line, which branches off from the exhaust-gas discharge system downstream of the turbines and opens into the intake system.

Here, embodiments of the supercharged internal combustion engine are provided in which the line opens into the intake system upstream of the compressors.

Above, the supercharged internal combustion engine is equipped with a low-pressure EGR arrangement. In contrast to a high-pressure EGR arrangement, in which exhaust gas extracted from the exhaust-gas discharge system upstream of the turbines is introduced into the intake system, in the case of a low-pressure EGR arrangement exhaust gas, which has already flowed through the turbines, is recirculated to the inlet side. For this purpose, the low-pressure EGR arrangement comprises a recirculation line that branches off from the exhaust-gas discharge system downstream of the turbines and opens into the intake system upstream of the compressors.

The main advantage of the low-pressure EGR arrangement in relation to the high-pressure EGR arrangement is that the exhaust-gas flow introduced into the turbines during exhaust-gas recirculation is not reduced by the recirculated exhaust-gas flow rate. The entire exhaust-gas flow is always available at the turbines for generating an adequately high charge pressure.

The exhaust gas which is recirculated via the low-pressure EGR arrangement to the inlet side, and preferably cooled, is generally mixed with fresh air upstream of the compressors. The mixture of fresh air and recirculated exhaust gas produced in this way forms the charge air, which is supplied to the compressors and compressed.

Here, the fact that exhaust gas is conducted through the compressors during the course of the low-pressure EGR is not detrimental, because exhaust gas is used which has already been subjected to exhaust-gas aftertreatment, preferably in a particle filter. There is therefore no risk of depositions in the compressors, which change the geometry, in particular the flow cross-sections, and thereby impair the efficiency of the compressors.

Embodiments of the supercharged internal combustion engine are provided in which a charge-air cooler is arranged in the intake system downstream of the compressors. The charge-air cooler lowers the air temperature and thereby increases the density of the charge air, as a result of which the cooler also contributes to improved charging of the combustion chamber with air, that is to say to a greater air mass.

Here, embodiments are provided in which a line for exhaust-gas recirculation opens into the intake system downstream of the charge-air cooler. In this way, the exhaust-gas flow is not conducted through the charge-air cooler, and, consequently, the cooler cannot be fouled by deposits of pollutants, in particular soot particles and oil, contained in the exhaust-gas flow.

Embodiments of the supercharged internal combustion engine may also be advantageous in which an exhaust-gas recirculation arrangement is provided which comprises a line which branches off from the exhaust-gas discharge system between the turbines and opens into the intake system at a suitable point. The suitability is dependent in particular on whether the pressure gradient required for the recirculation can be ensured or generated.

The second sub-object on which the disclosure is based is achieved by means of a method, which is distinguished by the fact that, in the warm-up phase, the first bypass line is opened up, and the exhaust gas is conducted past the second turbine via the first bypass line.

That which has been stated in connection with the internal combustion engine according to the disclosure likewise applies to the method according to the disclosure.

Figure 1:
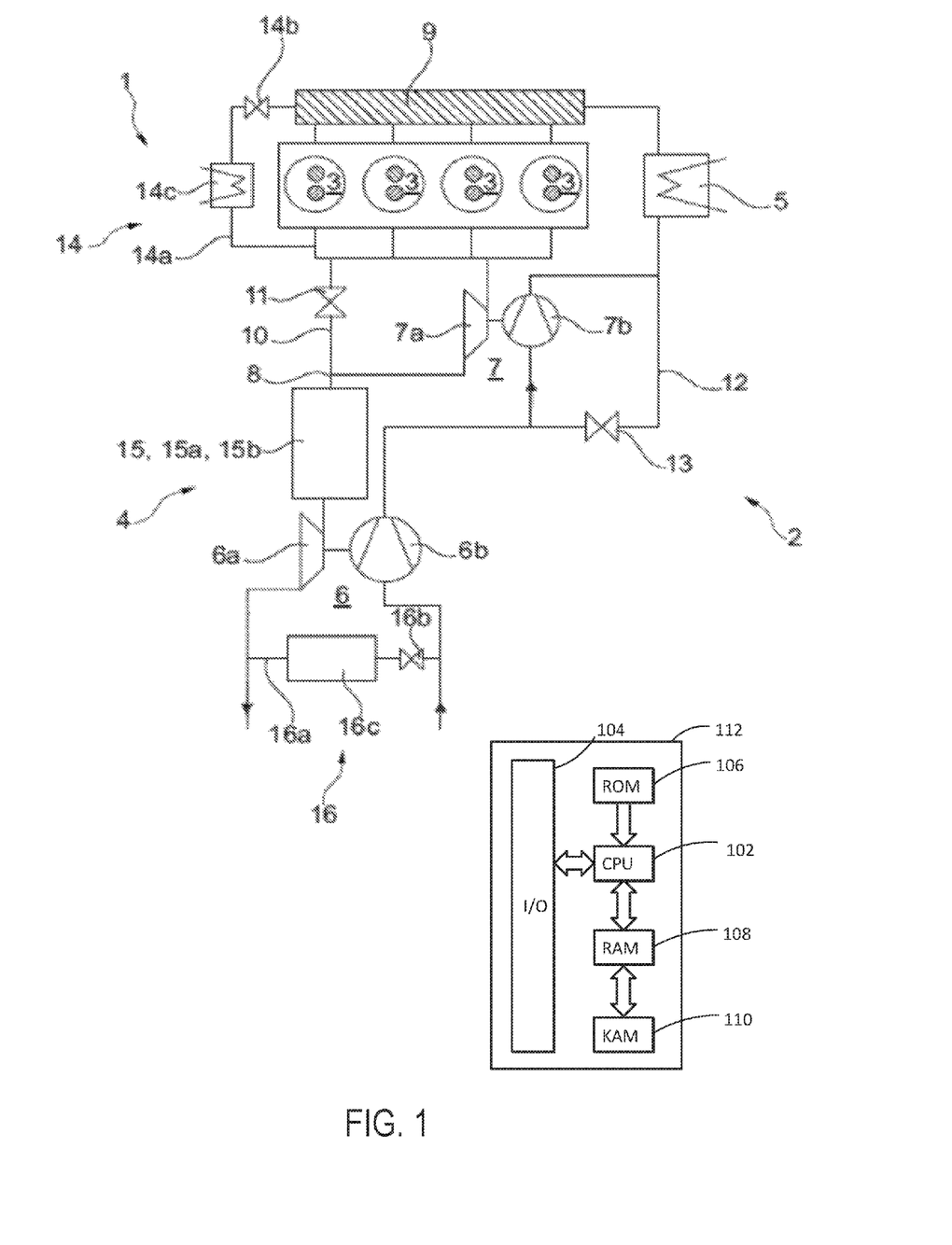
FIG. 1 schematically shows a first embodiment of a supercharged internal combustion engine.

FIG. 1 shows a first embodiment of the supercharged internal combustion engine 1, based on the example of a four-cylinder in-line engine. FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example Cylinders 3 of the internal combustion engine 1 are arranged along the longitudinal axis of the cylinder head that is to say in a line. For the supply of charge air to the cylinders 3, an intake system 2 is provided, and for the discharge of the exhaust gases from the cylinders 3, an exhaust-gas discharge system 4 is provided.

The internal combustion engine 1 is equipped with a first exhaust-gas turbocharger 6, and a second exhaust-gas turbocharger 7 which are arranged in series and which each comprise a first turbine 6a, and a second turbine 7a arranged in the exhaust-gas discharge system 4 and a first compressor 6b, and a second compressor 7b arranged in the intake system 2 and of which the first exhaust-gas turbocharger 6 serves as a low-pressure stage 6 and the second exhaust-gas turbocharger 7 serves as a high-pressure stage 7.

For this reason, the first compressor 6b is designed to be larger than the second compressor 7b, because, with this arrangement of the first exhaust-gas turbocharger 6 and the second exhaust-gas turbocharger 7, the first compressor 6b forms the low-pressure stage 6 within the context of the two-stage compression, whereas the second compressor 7b compresses the already pre-compressed air and thus constitutes the high-pressure stage 7.

For the same reason, the first turbine 6a is designed to be larger than the second turbine 7a. This is because, within the context of the two-stage supercharging, the second turbine 7a serves as a high-pressure turbine 7a, whereas the first turbine 6a serves for expanding an exhaust-gas flow which is already at a relatively low pressure and has a relatively low density owing to the fact that it has already passed through the high-pressure stage 7.

A charge-air cooler 5 is arranged in the intake system 2 downstream of the first compressor 6b, and the second compressor 7b. The charge-air cooler 5 may lower the air temperature and thereby increases the density of the charge air, as a result of which the cooler contributes to improve charging of the cylinders 3 with air, which is supplied to the cylinders 3 via a plenum 9.

The second turbine 7a of the second exhaust-gas turbocharger 7 has a first bypass line 10 which branches off from the exhaust-gas discharge system 4 upstream of the second turbine 7a and which opens into the exhaust-gas discharge system 4 again, so as to form a junction point 8, between the first turbines 6a, and the second turbine 7a, wherein a shut-off element 11 is arranged in the bypass line 10.

In the embodiment illustrated in FIG. 1, the second compressor 7b has a second bypass line 12, which branches off from the intake system 2 upstream of the second compressor 7b and between the first compressor 6b, and the second compressor 7b and which opens into the intake system 2 again downstream of the second compressor 7b and between the second compressor 7b and the charge-air cooler 5 and in which a shut-off element 13 is arranged.

Arranged in the exhaust-gas discharge system 4 between the turbines first turbine 6a, and the second turbine 7a there is a combined exhaust-gas aftertreatment system 15, which comprises an oxidation catalytic converter 15a and a particle filter 15b. Here, the exhaust-gas aftertreatment system 15 is arranged between the junction point 8 and the first turbine 6a of the first exhaust-gas turbocharger 6, such that all of the exhaust gas of the internal combustion engine 1 passes through the exhaust-gas aftertreatment system 15, and undergoes aftertreatment, under all operating conditions.

The internal combustion engine 1 illustrated in FIG. 1 is furthermore equipped with a low-pressure EGR arrangement 16 which comprises a recirculation line 16a, which recirculation line branches off from the exhaust-gas discharge system 4 downstream of the first turbine 6a and the second turbine 7a and opens into the intake system 2 upstream of the first compressor 6b, and the second compressor 7b and has a cooler 16c arranged therein. The cooler lowers the temperature in the hot exhaust-gas flow before, upstream of the first compressors 6b, and the second compressor 7b, the exhaust gas is mixed with fresh air and forms the charge air. Also arranged in the recirculation line 16a is a shut-off element 16b which functions as an EGR valve 16b and which serves for adjusting the exhaust-gas flow rate recirculated via the low-pressure EGR arrangement 16.

To be able to generate very high recirculation rates, an additional exhaust-gas recirculation arrangement 14 is provided. To form the high-pressure EGR arrangement 14, a line 14a is provided which branches off from the exhaust-gas discharge system 4 upstream of the first turbine 6a, and the second turbine 7a and which opens into the intake system 2 downstream of the charge-air cooler 5. To adjust the exhaust-gas flow rate recirculated via the high-pressure EGR arrangement 14, a shut-off element 14b which serves as an EGR valve 14b is arranged in the line 14a. The high-pressure EGR arrangement 14 also has a cooler 14c.

The engine system may further include a control system. The control system may include a controller 112. The controller 112 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 1, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 112 from signal PIP. One or more temperature sensors (not shown) may be positioned in the exhaust to measure exhaust gas temperature, exhaust-gas aftertreatment system temperature, or other temperatures.

Storage medium read-only memory 106 can be programmed with computer readable data representing instructions executable by processor 102 for performing the methods described below as well as other variants that are anticipated but not specifically listed. Example methods are described with reference to FIGS. 2A and 2B.

The controller 112 receives signals from the various sensors of FIG. 1 and employs the various actuators of FIG. 1 to adjust engine operation based on the received signals and instructions stored on a memory of the controller. For example, in order to adjust a position of shut-off element 11, the controller may receive feedback from one or more sensors to determine engine load, engine speed, and/or aftertreatment device temperature (such as feedback from MAF, MAP, PIP sensors, and temperature sensors) and may then adjust an actuator coupled to the shut-off element 11 to adjust the position of the shut-off element.

Figure 2A:
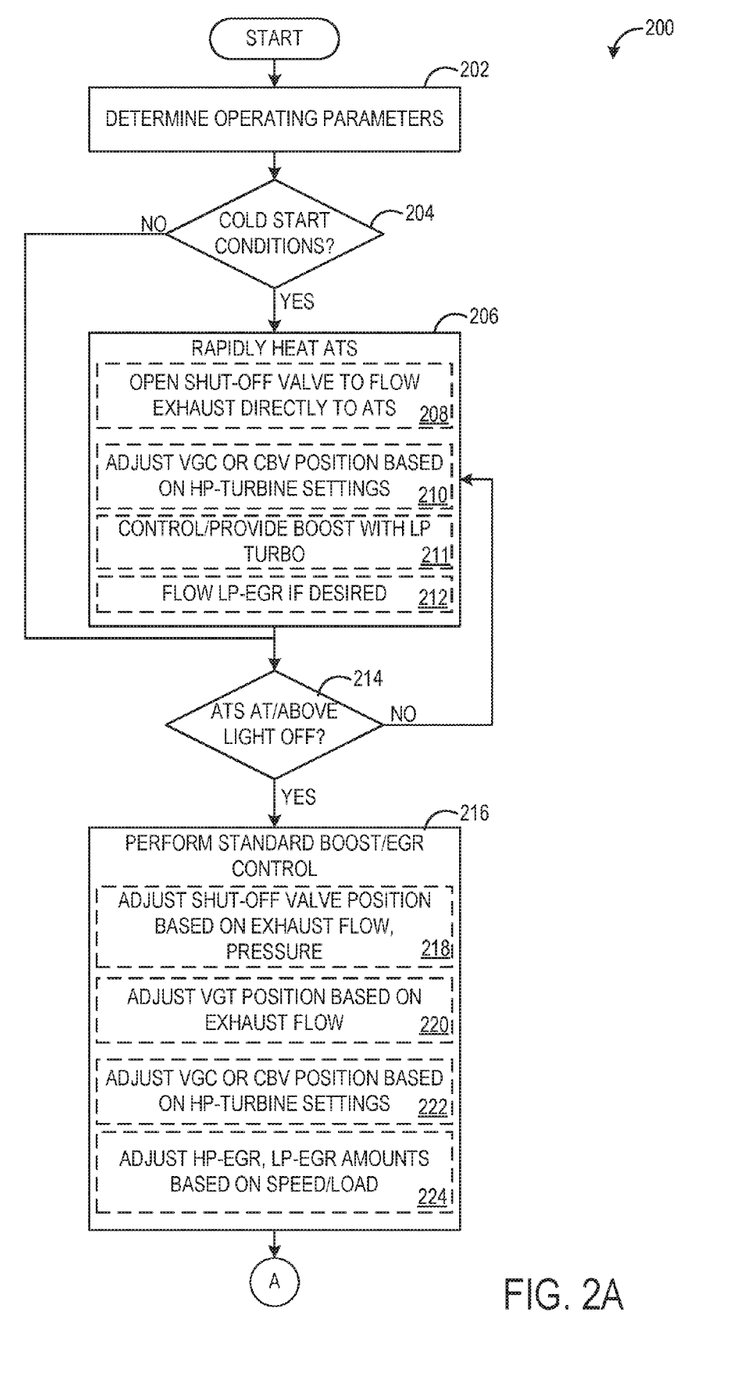
FIGS. 2A and 2B are a flow chart illustrating a method for operating an engine system.
Figure 2B:
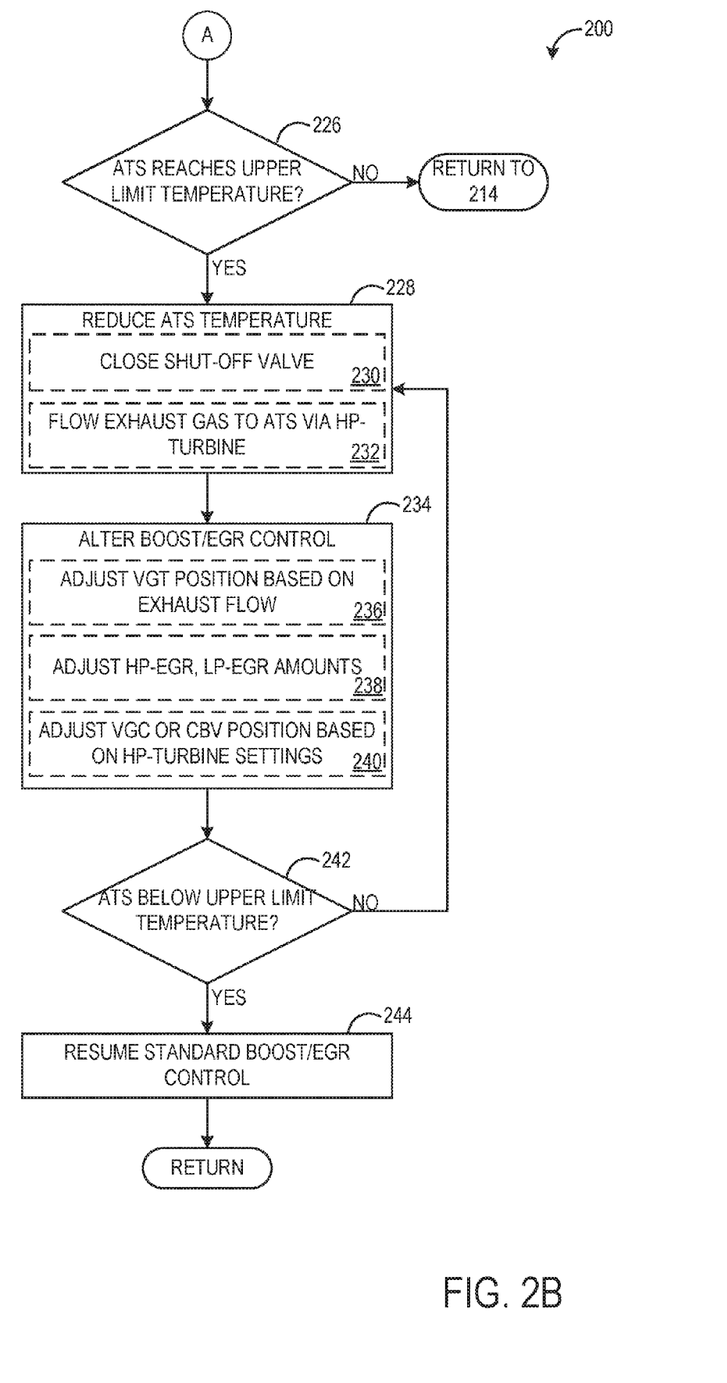

Turning to FIGS. 2A and 2B, a method 200 for operating an engine system is illustrated. Method 200 may be carried out according to non-transitory instructions stored in memory of a controller, such as controller 112 of FIG. 1, in order to adjust various operating parameters of an engine (e.g., engine 1 of FIG. 1) to provide designated boost pressure while managing a temperature of an exhaust-gas aftertreatment system, depending on detected engine parameters. The engine may include a first turbocharger (e.g., turbocharger 6 of FIG. 1) including a first turbine and a first compressor and a second turbocharger (e.g., turbocharger 7 of FIG. 1) including a second turbine and a second compressor. The second turbocharger may a high-pressure turbocharger and thus the second turbine may be positioned upstream of the first turbine in an exhaust gas flow direction. The first turbocharger may be a low-pressure turbocharger. An exhaust-gas aftertreatment system (ATS) may be arranged in an exhaust passage between the two turbines (such as exhaust-gas aftertreatment system 15 of FIG. 1). As described above, a shut-off valve (e.g., shut-off element 11) may be coupled in parallel with the second turbine, allowing exhaust gas to bypass the second turbine under some conditions. Further, a high-pressure EGR system may couple the exhaust upstream of the second turbine to the intake and a low-pressure EGR system may couple the exhaust downstream of the first turbine to the intake.

Instructions for carrying out method 200 may be executed by the controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, method 200 includes determining engine operating parameters. The determined operating parameters may include, but are not limited to, engine load, engine speed, boost pressure (which may be a measurement of intake manifold pressure relative to ambient pressure, for example), ATS temperature, and other parameters. At 204, method 200 determines if the engine is operating under cold start conditions, which may include the engine being started while at ambient temperature. If the engine is not operating under cold start, conditions, method 200 proceeds to 214, which will be described below.

If the engine is operating under cold start conditions, method 200 proceeds to 206 to rapidly heat the ATS. During cold start conditions, one or more components of the ATS (such as the oxidation catalyst) may be below a light-off temperature, and as such emissions may be compromised during cold start conditions. Thus, it may be desirable to rapidly heat the ATS. Rapidly heating the ATS may include, as indicated at 208, opening a shut-off valve (e.g., shut-off element 11 of FIG. 1) coupled in a bypass line around a second, high-pressure turbine (e.g., turbine 7a of FIG. 1), which may also be referred to as the HP turbine. During cold ATS conditions, opening the shut-off valve causes at least a portion of the exhaust gas from the engine to flow directly to the ATS, rather than flowing through the second turbine.

In doing so, the ATS may be rapidly heated.

Rapidly heating the ATS may also include adjusting one or more parameters of a compressor coupled to the HP turbine. As indicated at 210, a variable geometry compressor (VGC) setting or compressor bypass valve (CBV) position may be adjusted based on the HP turbine settings, such that air flow through the compressor matches exhaust flow through the HP turbine.

During bypass of the HP turbine, desired boost may be provided and/or controlled via the low-pressure turbocharger (e.g., turbocharger 6 of FIG. 1), as indicated at 211. The boost provided to the intake may be controlled to a designated boost pressure, if indicated, by adjusting various parameters of the LP turbocharger, including adjusting an amount of exhaust bypass around the LP turbine, adjusting VGT settings of the LP turbine, and/or adjusting an amount of compressor flow through the LP compressor.

Further, rapid heating of the ATS may include flowing LP-EGR, if desired, as indicated at 212. To flow LP-EGR, an LP-EGR valve may be at least partially opened (e.g., shut-off element 16b of FIG. 1). Further, this may include closing or fully closing an HP-EGR valve (e.g., shut-off element 14b). By flowing LP-EGR rather than HP-EGR during ATS warm-up, more exhaust may be available to flow through the ATS.

At 214, method 200 determines if the ATS is at or above light-off temperature, or another desired temperature of the ATS. For example, during regeneration of one or more components of the ATS (e.g., particulate filter), the engine may be operated in a manner to increase ATS temperature to burn off stored soot particles, for example. Thus, at least during regeneration, the desired ATS temperature may include temperatures above a regeneration threshold.

If the ATS is not at or above light-off or a regeneration temperature, method 200 continues to rapidly heat the ATS, as explained above. If the ATS is at or above light-off temperature or other designated temperature, method 200 proceeds to 216 to perform standard boost/EGR control. The standard control may include adjusting a position of the shut-off valve coupled in the bypass line around the second, HP turbine, as indicated at 218. During standard boost control, the shut-off valve may be adjusted based on exhaust gas mass flow, engine speed and load, and/or other parameters, to provide desired boost pressure to the engine while maintaining the second turbine within its optimal operating range. This may include opening the shut-off valve as exhaust gas mass flow increases. In another example, the shut-off valve position may be adjusted differentially during transient conditions relative to steady state operating conditions. For example, even during relatively high exhaust flow conditions where the second turbine would typically be bypassed, the shut-off valve may be adjusted (e.g., closed) in response to an operator tip-in to quickly provide requested boost to deliver the requested torque, owing to the rapid response of the smaller-dimensioned second turbine and closer position to the engine in the exhaust stream. Further, the shut-off valve may be adjusted based on exhaust pressure. As will be explained in more detail below, it may be desirable during some engine speed/load conditions to flow HP-EGR. However, it may be difficult to flow HP-EGR under all conditions, as HP-EGR flow may rely on exhaust pressure being higher than intake manifold pressure. Thus, if exhaust pressure is below a threshold (e.g., below intake pressure), the shut-off valve may be move to a more closed position to direct additional exhaust gas through the HP turbine, thus increasing exhaust backpressure to flow the HP-EGR. Further, during standard boost control exhaust gas may flow through the downstream LP turbine after flowing through or around the upstream HP turbine.

In some examples, the standard boost control may include adjusting a variable geometry turbine (VGT) position based on exhaust flow or other parameters, as indicated at 220. The HP turbine may be a VGT that includes vanes/nozzles that may be adjusted to provide an aspect ratio based on exhaust flow, for example increasing the aspect ratio as exhaust flow increases. Additionally, a position of a variable geometry compressor (VGC) and/or compressor bypass valve (CBV), also referred to as a shut-off element (e.g., shut-off element 13 of FIG. 1) may be adjusted based on HP turbine settings, as indicated at 222. The VGC vane/nozzle positions and/or CBV may be adjusted in coordination with the VGT adjustment, or in coordination with the shut-off valve position adjustment, to match compressor flow to turbine flow, for example. In one example, if the shut-off valve around the second turbine is closed during a transient event, the CBV may be opened to increase compressor air flow.

In some examples, the standard boost and EGR control may further include adjusting one or more of a high-pressure EGR (HP-EGR) and low-pressure EGR (LP-EGR) amount based on engine speed and load, or other suitable parameter, as indicated at 224. In this way, desired EGR for controlling emissions may be provided based on engine speed and load, and further may be proportioned between the HP-EGR and LP-EGR systems to provide desired transient response or other parameters. For example, a larger portion of HP-EGR may be provided during high engine speed and/or high engine load conditions, while a larger portion of LP-EGR may be provided during low engine speed and/or low engine load conditions.

At 226, method 200 determines if the ATS has reached an upper limit threshold. The upper limit threshold temperature may be an upper limit temperature of the ATS, above which degradation may occur. For example, during particulate filter regeneration, the temperature of the particulate filter may get too high during certain engine operating conditions (e.g., when excess oxygen supplied to the particulate filter). If the ATS has not reached the upper limit temperature, method 200 returns to 214 to again assess if the ATS is at or above light-off temperature, and if so, continue performing the standard boost/EGR control described above. Further, in some operating conditions, it may be possible for the ATS to drop below the light-off temperature, or to drop below a desired ATS temperature (e.g., a regeneration temperature), and thus if at 214 it is determined the ATS has dropped below a designated temperature, the rapid heating of the ATS may be performed, as described above.

If it is determined at 226 that the ATS has reached or exceed the upper limit temperature, method 200 proceeds to 228 to reduce ATS temperature to prevent degradation to the ATS. As indicated at 230, the shut-off valve may be closed in order to flow exhaust gas to the ATS via the HP turbine, as indicated at 232. In doing so, heat may be lost at the second turbine, lowering the temperature of the exhaust entering the ATS.

At 234, method 200 includes altering the boost/EGR control based on the adjustment to the shut-off valve position. This may include, as indicated at 236, adjusting the VGT position, for example increasing the aspect ratio in order to allow the second turbine to accept the increased exhaust flow. Further, in some examples, HP-EGR and/or LP-EGR amounts may be adjusted, as indicated at 238. For example, to divert exhaust flow away from the second turbine, the proportion of HP-EGR may be increased, which may result in a corresponding reduction of LP-EGR amounts, at least in some conditions. Further still, one or more aspects of the second compressor coupled to the HP turbine may be adjusted in correspondence to the adjustment to the VGT/shut-off valve position, such as adjusting the VGC or CBV position, as indicated at 240.

At 242, method 200 determines if the ATS has dropped back below the upper limit threshold. If not, method 200 continues back to 228 to reduce ATS temperature. If the ATS has dropped back below the upper limit threshold, method 200 proceeds to 244 to resume the standard boost/EGR control, as described above. Method 200 then returns.

In this way, by providing a two-stage turbocharger in series arrangement with a high-pressure turbine arranged upstream of a low-pressure turbine, and by including a bypass around the high-pressure turbine, the high-pressure turbine may be dimensioned to provide optimal boost control during low exhaust flow and/or transient conditions, while the low-pressure turbine may be dimensioned to provide optimal boost control during higher exhaust flow conditions. By positioning the aftertreatment system between the two turbines, rapid aftertreatment system warm-up may be achieved without sacrificing boost control and allowing the high-pressure turbine to be packaged in a close-coupled position to the engine. Additional intake and exhaust flow control may be provided by the VGT configuration of the high-pressure turbine, as well as compressor control of the high-pressure compressor. Both HP-EGR and LP-EGR may be utilized to enable EGR to be utilized across a wide range of operating parameters. Further, the temperature of the aftertreatment system may be managed (e.g., maintained above light-off, below an upper limit, and/or at a regeneration threshold) by controlling flow through or around the high-pressure turbine and/or managing HP-EGR flow. During conditions where the aftertreatment system temperature is actively managed via the flow through or around the high-pressure turbine, boost control may be maintained due to the provision of the low-pressure turbocharger, and/or by coordinating adjustments to the VGT configuration of the high-pressure turbine as well as corresponding adjustments to parameters of the high-pressure compressor.

The technical effect of the above described exhaust-gas aftertreatment system is that under all operating conditions, exhaust gas passes entirely through the at least one exhaust-gas aftertreatment system, such that no further additional exhaust-gas aftertreatment system of the same type has to be provided downstream of the low-pressure turbine, increasing efficiency and lowering system cost and complexity.

An embodiment of a system includes a first turbocharger including a first turbine and a first compressor; a second turbocharger including a second turbine and a second compressor in series with the first turbocharger, the second turbine arranged in an exhaust passage upstream of the first turbine, and the second compressor arranged in an intake passage downstream of the first compressor; a bypass line coupled across the second turbine and including a shut-off valve; a high-pressure exhaust-gas recirculation (HP-EGR) passage coupling the exhaust passage upstream of the second turbine to the intake passage, flow of EGR through the HP-EGR passage controlled by an HP-EGR valve; an aftertreatment system arranged in the exhaust passage between the first turbine and the second turbine, the bypass line including an outlet coupled to the exhaust passage upstream of the aftertreatment system; and a controller including instructions for adjusting a position of the shut-off valve based on a temperature of the aftertreatment system, and adjusting a position of the HP-EGR valve based on the adjustment to the shut-off valve. In a first example, the second turbine is a variable geometry turbine, and the controller includes further instructions for adjusting an aspect ratio of the variable geometry turbine based on the adjustment to the shut-off valve. In a second example, which may include the first example, the controller includes instructions for, responsive to the temperature of the aftertreatment system being below a lower threshold temperature, opening the shut-off valve and closing the HP-EGR valve, and responsive to the temperature of the aftertreatment system being above an upper threshold temperature, closing the shut-off valve and opening the HP-EGR valve. Thus, adjusting the position of the HP-EGR valve based on the adjustment to the shut-off valve may include closing the HP-EGR valve when the shut-off valve is opened, and may include opening the HP-EGR valve when the shut-off valve is closed. Further, when the shut-off valve is closed, the aspect ratio of the second turbine may be increased, and when the shut-off valve is opened, the aspect ratio of the second turbine may be decreased. Likewise, when the shut-off valve is closed and/or the aspect ratio of the second turbine is increased, an aspect ratio of a second compressor coupled to the second turbine may be increased and/or a compressor bypass valve coupled around the second compressor may be closed. When the shut-off valve is opened and/or the aspect ratio of the second turbine is decreased, the aspect ratio of the second compressor may be decreased and/or the compressor bypass valve may be opened.

In a third example, which may include one or both of the first and second examples, the controller includes instructions for, responsive to the temperature of the aftertreatment system being between the lower threshold temperature and upper threshold temperature, adjusting the position of the shut-off valve based on exhaust flow and adjusting a position of the HP-EGR valve based on engine speed and load. Adjusting the position of the shut-off valve based on exhaust flow may include increasing an opening of the shut-off valve as exhaust flow increases and decreasing an opening of the shut-off valve as exhaust flow decreases. Adjusting a position of the HP-EGR valve based on engine speed and load may include increasing an opening of the HP-EGR valve as engine speed and load increase and decreasing an opening of the HP-EGR valve as engine speed and load decrease. In some examples, as the HP-EGR valve is adjusted, an LP-EGR valve may be adjusted in correspondence, e.g., the LP-EGR may closed as the HP-EGR is opened and vice versa.

An embodiment of a method includes responsive to aftertreatment system temperature below a first threshold temperature, fully opening a shut-off valve coupled across a high-pressure turbine arranged upstream of the aftertreatment system; and responsive to aftertreatment system temperature above a second threshold temperature, higher than the first threshold temperature, fully closing the shut-off valve and adjusting a geometry of the high-pressure turbine. In an example, the method further comprises, responsive to adjusting the geometry of the high-pressure turbine, adjusting a geometry of a high-pressure compressor operatively coupled to the high-pressure turbine. In an example, as the shut-off valve is closed, the geometry of the high-pressure turbine may be adjusted to increase the aspect ratio of the high-pressure turbine. In an example, as the aspect ratio of the high-pressure turbine increases, the aspect ratio of the high-pressure compressor may be increased. In an example, when the aftertreatment system temperature is below the first threshold temperature, the aspect ratio of the high-pressure turbine may be decreased as the shut-off valve is opened.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine, comprising: a first exhaust-gas turbocharger with a first turbine and a first compressor; a second exhaust-gas turbocharger with a second turbine and a second compressor, arranged in series with the first exhaust-gas turbocharger, wherein the second turbine of the second exhaust-gas turbocharger is arranged in an exhaust-gas discharge system upstream of the first turbine of the first exhaust-gas turbocharger, and the second compressor of the second exhaust-gas turbocharger is arranged in an intake system downstream of the first compressor of the first exhaust-gas turbocharger;
a first bypass line branching off from the exhaust-gas discharge system upstream of the second turbine and opens into the exhaust-gas discharge system again to form a junction point between the first turbine and the second turbine including a first shut-off element;
an exhaust-gas recirculation arrangement associated with the exhaust-gas discharge system including an exhaust-gas recirculation valve;
at least one exhaust-gas aftertreatment system arranged in the exhaust-gas discharge system between the first turbine and the second turbine, wherein the at least one exhaust-gas aftertreatment system is present between the junction point and the first turbine of the first exhaust-gas turbocharger;
an exhaust-gas aftertreatment system temperature sensor sensing a temperature of the aftertreatment system; and
a controller coupled to the exhaust-gas recirculation valve and the first shutoff element, the controller including executable instructions stored in non-transitory memory to adjust a position of the shut-off valve based on the temperature of the aftertreatment system determined via the controller, and to adjust a position of the exhaust-gas recirculation valve based on the position of the first shut-off element being adjusted.

2. The supercharged internal combustion engine of claim 1, further comprising a second bypass line which branches off from the intake system upstream of the second compressor of the second exhaust-gas turbocharger and opens into the intake system again downstream of the second compressor and in which a second shut-off element is arranged.

3. The supercharged internal combustion engine of claim 2, wherein the second bypass line is positioned in parallel with the second compressor.

4. The supercharged internal combustion engine as claimed in claim 3, further comprising a charge air cooler arranged in the intake system upstream of the second compressor.

5. The supercharged internal combustion engine of claim 1, wherein the at least one exhaust-gas aftertreatment system comprises an oxidation catalytic converter.

6. The supercharged internal combustion engine of claim 1, wherein the at least one exhaust-gas aftertreatment system comprises a particle filter.

7. The supercharged internal combustion engine of claim 1, wherein the first compressor is larger than the second compressor.

8. The supercharged internal combustion engine of claim 1, wherein the first turbine is larger than the second turbine.

9. The supercharged internal combustion engine of claim 1, wherein the exhaust-gas recirculation arrangement includes a line that branches off from the exhaust-gas discharge system upstream of the first turbine and the second turbine and opens into the intake system.

10. The supercharged internal combustion engine of claim 9, wherein the line opens into the intake system upstream of the first compressor and the second compressor.

11. The supercharged internal combustion engine of claim 9, wherein the line opens into the intake system downstream of the first compressor and the second compressor.

12. The supercharged internal combustion engine of claim 1, wherein a charge-air cooler is arranged in the intake system downstream of the first compressor and the second compressor.

13. A system, comprising:
a first turbocharger including a first turbine and a first compressor;
a second turbocharger including a second turbine and a second compressor in series with the first turbocharger, the second turbine arranged in an exhaust passage upstream of the first turbine, and the second compressor arranged in an intake passage downstream of the first compressor;
a bypass line coupled across the second turbine and including a shut-off valve;
a high-pressure exhaust-gas recirculation (HP-EGR) passage coupling the exhaust passage upstream of the second turbine to the intake passage, flow of EGR through the HP-EGR passage controlled by an HP-EGR valve;
an aftertreatment system arranged in the exhaust passage between the first turbine and the second turbine, the bypass line including an outlet coupled to the exhaust passage upstream of the aftertreatment system;
an exhaust-gas aftertreatment system temperature sensor sensing a temperature of the aftertreatment system; and
a controller coupled to the shut-off valve and the HP EGR valve, the controller including executable instructions stored in non-transitory memory to
adjust a position of the shut-off valve based on the temperature of the aftertreatment system determined via the controller, and
to adjust a position of the HP-EGR valve based on the position of the shut-off valve being adjusted.

14. The system of claim 13, wherein the controller includes further instructions for adjusting an aspect ratio of the second turbine based on the adjustment to the shut-off valve.

15. The system of claim 14, wherein the controller includes instructions for, responsive to the temperature of the aftertreatment system being below a lower threshold temperature as determined via the controller, opening the shut-off valve and closing the HP-EGR valve, and responsive to the temperature of the aftertreatment system being above an upper threshold temperature as determined via the controller, closing the shut-off valve and opening the HP-EGR valve.

16. The system of claim 15, wherein the controller includes instructions for, responsive to the temperature of the aftertreatment system being between the lower threshold temperature and upper threshold temperature as determined via the controller, adjusting the position of the shut-off valve based on exhaust flow via the controller and adjusting the position of the HP-EGR valve based on engine speed and load via the controller, and wherein the controller determines the engine speed, the engine load, and the temperature of the aftertreatment system.

17. A method for operating an engine, comprising:
determining engine operating conditions via a controller;
sensing an aftertreatment system temperature via a temperature sensor;
responsive to the aftertreatment system temperature being below a first threshold temperature as determined via the controller, fully opening a shut-off valve coupled across a high pressure turbine arranged upstream of an aftertreatment system via the controller;
responsive to the aftertreatment system temperature being above a second threshold temperature as determined via the controller, higher than the first threshold temperature, fully closing the shut-off valve via the controller; and
adjusting a position of a high pressure EGR valve based on an adjustment to a shut-off valve position.

18. The method of claim 17, further comprising, responsive to adjusting the geometry of the high pressure turbine, adjusting a geometry of a high pressure compressor operatively coupled to the high pressure turbine adjusting a compressor bypass valve via the controller such that air flow through a compressor coupled to the turbine is equal to exhaust flow through the turbine when the shut-off valve is fully opened.

* * * * *